Oct. 20, 1953     H. ANDERSON     2,656,213

CAMP TRAILER

Filed Nov. 14, 1950

INVENTOR.

Harold Anderson

Patented Oct. 20, 1953

2,656,213

UNITED STATES PATENT OFFICE 2,656,213

CAMP TRAILER

Harold Anderson, Lansing, Mich.

Application November 14, 1950, Serial No. 195,606

1 Claim. (Cl. 296—23)

This invention relates to a camp trailer which can be folded into a trailer box.

One object of my invention is to provide a light structure of moderate cost which gives plenty of inside room when set up, but may be folded into compact form for travel. Another object is to provide a structure which may be quickly set up, not requiring the use of bows or braces, and practically no stretching of canvas.

Another object is to provide a trailer which when fully set up for camping may be hauled behind a car. These and other objects are accomplished by means shown in the accompanying drawing, fully set forth in the following description, and distinctly pointed out in the claim.

Figure 1:
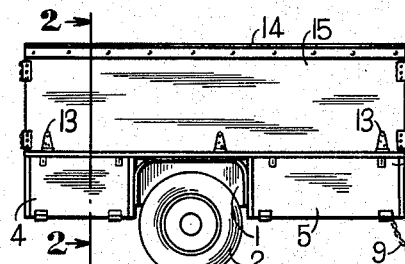
Fig. 1 is a side view of the trailer with all parts closed.
Figure 2:
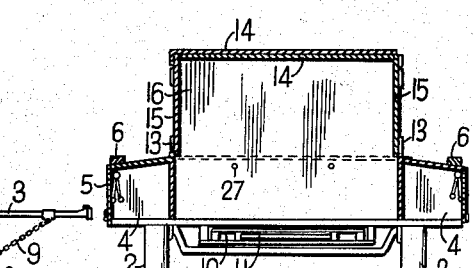
Fig. 2 is a cross-section on line 2—2 of Fig. 1, looking in the direction of the arrow.
Figure 5:
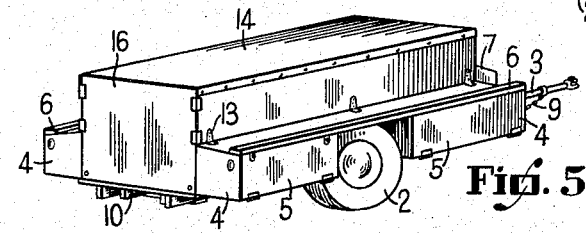
Fig. 5 is a perspective view, looking from the rear of the trailer closed for travel.
Figure 6:
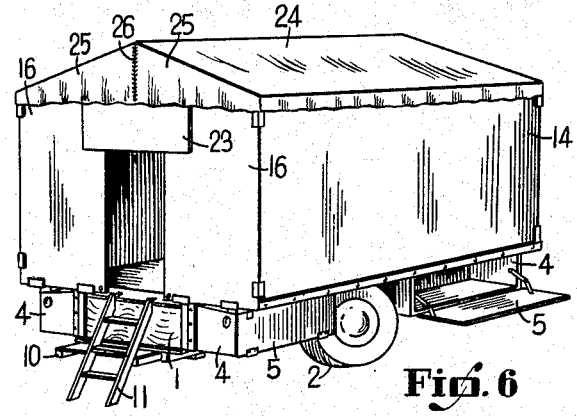
Fig. 6 is a perspective view, looking from the rear, of the trailer when fully set up.

This camp trailer consists of three parts, a trailer box, side walls and a roof. The trailer box 1 is in general of the usual vehicle body form with front and back ends and sides, and is mounted upon a pair of wheels 2 and provided with a hitch 3, all of the usual form not requiring further description. However, on each side of the main box are two storage lockers 4 on each side, one of each pair being in front of the other in rear of the wheel on that side as shown in Figs. 1, 5 and 6. These lockers are provided with hinged side doors 5 as best shown in Figs. 1, 5 and 6, and their tops are inclined as shown in Fig. 2. This figure also shows on the top of each locker on its outer edge a rail 6 for a purpose indicated later. The trailer has also in front a tool box 7. In front is a pivoted support 8 extending entirely across beneath the bottom of the trailer box. This can be folded beneath the box when not in use during travel, and when employed as a support is kept in vertical position by chains 9, as shown in Fig. 1. Slidably mounted at the rear beneath the bottom of the box is a shelf-like step 10 which is pulled out when in use. This step may be replaced by a ladder 11 as shown in Fig. 6.

Figure 3:
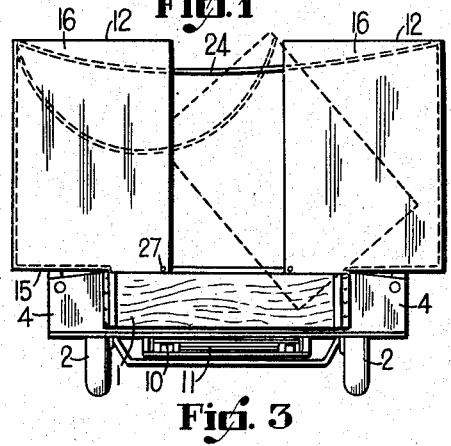
Fig. 3 is a rear view showing the side walls set up, the successive positions of one of them during this operation being shown in dotted lines.
Figure 4:
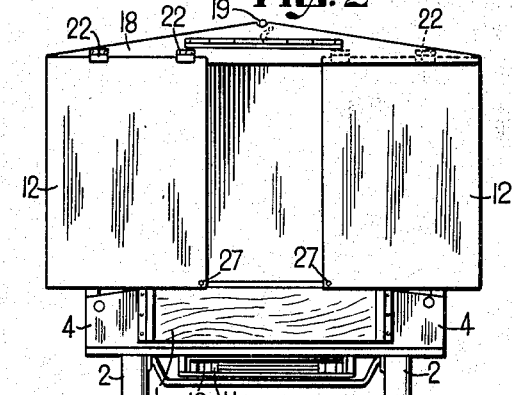
Fig. 4 shows a rear view of the trailer when all parts have been set up, but before the canvas roof and gable covering have been pulled into position.

The similar wall members 12, one on each side, are attached to the tops of the boxes 4 by hinges 13. As best shown by Figs. 2 and 3, each wall member is of similar form, consisting of four parts, one 14 running longitudinally which forms a side wall of the erected structure, one 15 also running longitudinally which carries one leaf of each attaching hinge, and similar ends 16 which form partial end walls of the erected structure. While the wall members 12 are exactly similar, one has slightly larger parts than the other, so that its end walls lie outside those of the trailer box when the parts are folded, while the smaller member when the parts are folded has its end walls lying inside those of the trailer box. In this condition the walls 14 form a top for the trailer box, while the parts 15 form continuations of the side walls of the trailer box. In erected position of the wall members the hinge carrying parts 15 rest directly upon the side rails 6 on top of lockers 4 and thus are brought into horizontal position as shown in Fig. 3, thus adapting them for use as seats or bunks. These wall members are held in erected position by bolts 27 through the body ends. These may be of plywood.

Figure 7:
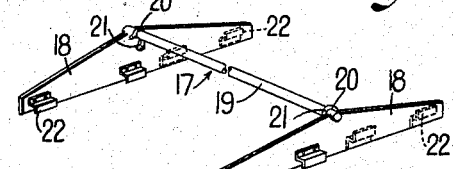
Fig. 7 is a perspective view of the gables and ridge pole.

In Fig. 7 is shown the rigid part 17 of the roof member, consisting of two similar gables 18, which may be made of plyboard, and a light connecting ridge pole 19. This pole has a circumferential groove 20 at each end which may be engaged by a pivoted latch 21 on each gable to keep the pole from sliding. Also on each gable end are a number of angular clips 22 for engagement with the upper edges of the end walls 16. It will be seen that these clips at right and left side of each gable are put on opposite surfaces. This is because the halves 16 of each end wall are not in alignment due to one lying within and the other without the trailer box. Fig. 6 shows attached to the outside of a gable a canvas cover 23 to overlap the space between the end wall portions 16. This curtain in use is fastened by snap fasteners to the end wall portion 16 on each side, and when not in use is rolled up. A mosquito curtain of net is on the inside opposite the canvas one, so as to permit ventilation, there being a similar arrangement of canvas and net curtains at the opposite ends of the structure.

Fig. 3 shows a canvas top 24 having each side edge permanently fastened to what becomes the upper edge of each wall 14 when in erected position. The dotted lines indicate the various positions taken by this top during the elevation of the side members 12. When this has been completed and the gable ends 18 with their connecting ridge pole 19 put into position by insertion from beneath the canvas, the roof then takes the form shown in Fig. 6. To each end of the cover 24 are attached similar triangular flaps 25, one on each side. After the main cover 24 is in position these flaps are turned down over each gable, and the pair at each end united by a zipper fastener 26 to form a water-tight unit.

Having thus described my invention, I claim:

A camp trailer comprising a body with sides thereon, a pair of supporting wheels on said body, a locker affixed to each side of said body forwardly of said wheels, a locker affixed to each side of the body rearwardly of said wheels, all of said lockers extending outwardly beyond the outermost parts of their adjacent wheels, a longitudinally extending rail affixed to the outer portions of the tops of each pair of lockers upon each side of said body, side wall members respectively disposed at the respective sides of the body, each of the side wall members having a part hingedly connected to the side of said body inwardly of said lockers and adapted when the structure is erected to lie upon an adjacent rail, a side wall part secured to each hinged part and adapted when the structure is erected to extend vertically from the hinged part above the outer portions of the tops of the lockers, and a partial end wall affixed to each end of each side wall part at right angles thereto, a pair of gables removably mounted on said vertical end walls when the structure is erected, a ridge pole removably and centrally interconnected between said gables, and a roof cover of fabric removably mounted upon said ridge pole and gables, said side wall members, when the structure is closed adapted to have their respective side wall parts overlie one another and their respective hinged parts extending vertically from the sides of the body.

HAROLD ANDERSON.

References Cited in the file of this patent

UNITED STATES PATENTS

| Number | Name | Date |
|---|---|---|
| 1,596,924 | Curtis | Aug. 24, 1926 |
| 1,715,971 | Wilson | June 4, 1929 |

FOREIGN PATENTS

| Number | Country | Date |
|---|---|---|
| 29,115 | Australia | July 13, 1931 |
| 390,599 | Great Britain | Apr. 13, 1933 |